(12) United States Patent
Harrang et al.

(10) Patent No.: US 8,495,196 B2
(45) Date of Patent: Jul. 23, 2013

(54) SYSTEMS AND METHODS FOR ALIGNING MEDIA CONTENT DELIVERY SESSIONS WITH HISTORICAL NETWORK USAGE

(75) Inventors: Jeffrey P. Harrang, Sammamish, WA (US); David B. Gibbons, Redmond, WA (US); John M. Burnette, Seattle, WA (US)

(73) Assignee: Opanga Networks, Inc., Seattle, WA (US)

( * ) Notice: Subject to any disclaimer, the term of this patent is extended or adjusted under 35 U.S.C. 154(b) by 158 days.

(21) Appl. No.: 12/973,584

(22) Filed: Dec. 20, 2010

(65) Prior Publication Data

US 2011/0320607 A1  Dec. 29, 2011

Related U.S. Application Data

(60) Provisional application No. 61/316,132, filed on Mar. 22, 2010.

(51) Int. Cl.
  *G06F 15/16* (2006.01)
(52) U.S. Cl.
  USPC .............. 709/223; 709/226; 709/229; 705/35
(58) Field of Classification Search
  USPC ........................ 709/223, 226, 229; 705/7, 35
  See application file for complete search history.

(56) References Cited

U.S. PATENT DOCUMENTS

| | | | |
|---|---|---|---|
| 650,243 A | 5/1900 | Hart | |
| 5,706,281 A | 1/1998 | Hashimoto et al. | |
| 5,706,428 A | 1/1998 | Boer et al. | |
| 5,726,978 A | 3/1998 | Frodigh et al. | |
| 5,974,460 A | 10/1999 | Maddalozzo et al. | |
| 6,038,224 A | 3/2000 | Kim et al. | |
| 6,052,734 A | 4/2000 | Ito | |
| 6,311,065 B1 | 10/2001 | Ushiki et al. | |
| 6,327,677 B1 | 12/2001 | Garg et al. | |
| 6,339,785 B1 | 1/2002 | Feigenbaum | |
| 6,377,805 B1 | 4/2002 | Anvekar et al. | |
| 6,453,346 B1 | 9/2002 | Garg et al. | |
| 6,493,875 B1 | 12/2002 | Eames | |
| 6,512,865 B1 | 1/2003 | Shen et al. | |
| 6,529,476 B1 | 3/2003 | Magnussen | |
| 6,560,243 B1 | 5/2003 | Mogul | |
| 6,567,415 B1 | 5/2003 | Elwalid et al. | |
| 6,622,172 B1 | 9/2003 | Tam | |

(Continued)

FOREIGN PATENT DOCUMENTS

| | | |
|---|---|---|
| DE | 19831169 | 1/2000 |
| DE | 10208094 | 9/2003 |

(Continued)

*Primary Examiner* — Khanh Dinh

(57) ABSTRACT

A networked computing system for coordinating the distribution of burdensome media content using historical usage patterns. The networked computing system includes multiple network resources (e.g., wireless and wireline network access points) that provide communications service, user equipment, and data communications network facilitating data communications. Within the networked computing system, a current reference to a communications location of a user equipment can be evaluated to determine if a schedule for a media content transfer session should be modified based on a comparison of the current reference with historical references to one or more prior communications locations of the same user equipment. When it is determined that the schedule for the media content transfer session should be modified, a preferred network resource or a preferred device state, facilitating a less burdensome media content delivery, is determined for subsequent communications.

18 Claims, 9 Drawing Sheets

U.S. PATENT DOCUMENTS

| | | | |
|---|---|---|---|
| 6,640,212 B1 * | 10/2003 | Rosse | 705/7.13 |
| 6,651,105 B1 | 11/2003 | Bhagwat et al. | |
| 6,807,429 B2 | 10/2004 | Subrahmanya | |
| 6,845,398 B1 | 1/2005 | Galensky et al. | |
| 6,910,078 B1 | 6/2005 | Raman et al. | |
| 6,947,388 B1 | 9/2005 | Wagner | |
| 7,058,723 B2 | 6/2006 | Wilson | |
| 7,076,695 B2 | 7/2006 | McGee et al. | |
| 7,085,576 B2 | 8/2006 | Ranganathan | |
| 7,103,906 B1 | 9/2006 | Katz et al. | |
| 7,240,099 B2 | 7/2007 | Miyazaki et al. | |
| 7,349,337 B1 | 3/2008 | Mahdavi | |
| 7,451,205 B2 | 11/2008 | Cheung et al. | |
| 7,454,527 B2 | 11/2008 | Zhang et al. | |
| 7,496,675 B2 | 2/2009 | Obata et al. | |
| 7,512,066 B2 | 3/2009 | Santos et al. | |
| 7,519,030 B2 | 4/2009 | Cimini et al. | |
| 7,533,158 B2 | 5/2009 | Grannan et al. | |
| 7,536,626 B2 | 5/2009 | Sutivong et al. | |
| 7,539,752 B1 | 5/2009 | Chakravarti et al. | |
| 7,543,052 B1 | 6/2009 | Cesa Klein | |
| 7,568,045 B1 | 7/2009 | Agrawal | |
| 7,577,908 B2 | 8/2009 | Frazier et al. | |
| 7,594,260 B2 | 9/2009 | Porras et al. | |
| 7,617,312 B2 | 11/2009 | Tummalapalli | |
| 7,643,461 B2 | 1/2010 | Choi et al. | |
| 7,650,111 B2 | 1/2010 | Dennisson et al. | |
| 7,650,376 B1 | 1/2010 | Blumenau | |
| 7,688,733 B1 | 3/2010 | Mirza | |
| 7,698,416 B2 | 4/2010 | Potti et al. | |
| 7,765,324 B2 | 7/2010 | Imiya | |
| 7,895,560 B2 * | 2/2011 | Lovell | 716/119 |
| 8,078,515 B2 * | 12/2011 | John | 705/35 |
| 2002/0021465 A1 | 2/2002 | Moore | |
| 2002/0081971 A1 | 6/2002 | Travistino | |
| 2002/0116555 A1 | 8/2002 | Sommers et al. | |
| 2002/0156910 A1 | 10/2002 | Senda | |
| 2002/0159396 A1 | 10/2002 | Carlson et al. | |
| 2003/0014496 A1 | 1/2003 | Spencer et al. | |
| 2003/0028890 A1 | 2/2003 | Swart et al. | |
| 2003/0084182 A1 | 5/2003 | Mahiddini et al. | |
| 2003/0099201 A1 | 5/2003 | Hu et al. | |
| 2003/0110140 A1 * | 6/2003 | Morrison et al. | 705/400 |
| 2003/0145100 A1 | 7/2003 | Marchetto et al. | |
| 2003/0174677 A1 | 9/2003 | Mantha | |
| 2003/0204769 A1 | 10/2003 | Coughlin | |
| 2003/0221008 A1 | 11/2003 | England et al. | |
| 2004/0002362 A1 | 1/2004 | Chuah et al. | |
| 2004/0003105 A1 | 1/2004 | Berzosa et al. | |
| 2004/0015445 A1 | 1/2004 | Heaven et al. | |
| 2004/0017788 A1 | 1/2004 | Shmueli | |
| 2004/0042398 A1 | 3/2004 | Peleg et al. | |
| 2004/0066746 A1 | 4/2004 | Matsunaga | |
| 2004/0117459 A1 | 6/2004 | Fry | |
| 2004/0122969 A1 | 6/2004 | Ameigeiras et al. | |
| 2004/0143652 A1 | 7/2004 | Grannan et al. | |
| 2004/0168052 A1 | 8/2004 | Clisham et al. | |
| 2004/0218563 A1 | 11/2004 | Porter et al. | |
| 2005/0058138 A1 | 3/2005 | Burcher et al. | |
| 2005/0091395 A1 | 4/2005 | Harris et al. | |
| 2005/0091398 A1 | 4/2005 | Roberts et al. | |
| 2005/0128995 A1 | 6/2005 | Ott et al. | |
| 2005/0132049 A1 | 6/2005 | Inoue et al. | |
| 2005/0165948 A1 | 7/2005 | Hatime | |
| 2005/0169184 A1 | 8/2005 | Murgatroyd et al. | |
| 2005/0193069 A1 | 9/2005 | Brown et al. | |
| 2005/0198680 A1 | 9/2005 | Baran et al. | |
| 2005/0239412 A1 | 10/2005 | Kelz | |
| 2005/0256926 A1 | 11/2005 | Muhonen et al. | |
| 2005/0281270 A1 | 12/2005 | Kossi et al. | |
| 2005/0281277 A1 | 12/2005 | Killian | |
| 2005/0282500 A1 | 12/2005 | Wang et al. | |
| 2005/0289630 A1 | 12/2005 | Andrews | |
| 2006/0019665 A1 | 1/2006 | Aghvami et al. | |
| 2006/0025151 A1 | 2/2006 | Karaoguz et al. | |
| 2006/0026296 A1 | 2/2006 | Nagaraj | |
| 2006/0150055 A1 | 7/2006 | Quinard et al. | |
| 2006/0176824 A1 | 8/2006 | Laver et al. | |
| 2006/0268336 A1 | 11/2006 | Sakaniwa et al. | |
| 2006/0277277 A1 | 12/2006 | Landschaft et al. | |
| 2006/0282856 A1 | 12/2006 | Errico et al. | |
| 2007/0025301 A1 | 2/2007 | Petersson et al. | |
| 2007/0066297 A1 | 3/2007 | Jeidari-Bateni | |
| 2007/0086347 A1 | 4/2007 | Reynolds | |
| 2007/0100981 A1 * | 5/2007 | Adamczyk et al. | 709/223 |
| 2007/0142067 A1 | 6/2007 | Cheng et al. | |
| 2007/0165732 A1 | 7/2007 | Gerlach | |
| 2007/0211674 A1 | 9/2007 | Ragnar Karlberg et al. | |
| 2007/0239695 A1 | 10/2007 | Chakra et al. | |
| 2008/0126919 A1 | 5/2008 | Uskali et al. | |
| 2008/0161951 A1 | 7/2008 | Morris | |
| 2008/0162403 A1 | 7/2008 | Sundaresan | |
| 2008/0165693 A1 | 7/2008 | Castro et al. | |
| 2008/0195745 A1 | 8/2008 | Bowra et al. | |
| 2008/0205291 A1 | 8/2008 | Li et al. | |
| 2008/0208963 A1 | 8/2008 | Eyal et al. | |
| 2008/0212509 A1 | 9/2008 | Kim et al. | |
| 2008/0215873 A1 | 9/2008 | Bobrow | |
| 2008/0256272 A1 | 10/2008 | Kampmann et al. | |
| 2008/0275748 A1 * | 11/2008 | John | 705/7 |
| 2008/0319833 A1 | 12/2008 | Svendsen | |
| 2009/0100469 A1 | 4/2009 | Conradt et al. | |
| 2009/0164624 A1 | 6/2009 | Metcalf et al. | |
| 2009/0164646 A1 | 6/2009 | Christian et al. | |
| 2009/0327512 A1 | 12/2009 | Chapweske | |
| 2010/0198943 A1 | 8/2010 | Harrang et al. | |
| 2012/0254208 A1 * | 10/2012 | Duvoisin, III | 707/758 |

FOREIGN PATENT DOCUMENTS

| | | |
|---|---|---|
| EP | 1587290 | 10/2005 |
| EP | 1622385 A1 | 1/2006 |
| EP | 1841172 | 10/2007 |
| JP | 07336375 | 12/1995 |
| JP | 10124412 | 5/1998 |
| JP | 2005258912 | 9/2005 |
| KR | 102002-0017926 | 3/2002 |
| KR | 20020017926 | 3/2002 |
| KR | 102004-0028401 | 4/2004 |
| KR | 20040028401 | 4/2004 |
| KR | 100438697 | 7/2004 |
| KR | 100645742 | 11/2006 |
| KR | 10-2007-0013600 | 1/2007 |
| KR | 102007-0011811 | 1/2007 |
| KR | 100693023 81 | 3/2007 |
| KR | 20070053884 | 5/2007 |
| KR | 102007-0117197 | 12/2007 |
| KR | 100807264 B1 | 2/2008 |
| KR | 102008-0039324 | 5/2008 |
| WO | WO 9320637 | 10/1993 |
| WO | WO 0247414 | 6/2002 |
| WO | WO 2004114639 | 12/2004 |
| WO | WO 2005120122 | 12/2005 |
| WO | WO 2006099545 | 9/2006 |

* cited by examiner

SYSTEMS AND METHODS FOR ALIGNING MEDIA CONTENT DELIVERY SESSIONS WITH HISTORICAL NETWORK USAGE

CROSS REFERENCE TO RELATED APPLICATIONS

The present application claims the benefit of U.S. Provisional Application No. 61/316,132, filed Mar. 22, 2010, fully incorporated herein by reference.

FIELD OF THE INVENTION

The field of the present invention generally relates to systems and methods for optimizing data content delivery sessions via adaptive scheduling that accounts for historical resource usage and dynamically changing resource state data. More specifically, the invention allows for media content delivery sessions to be evaluated and optionally modified based on network usage patterns analyzed in combination with resource availability.

BACKGROUND OF THE INVENTION

With the evolution of modern data communications networks, vast amounts of digital content can now be readily transferred amongst end users, media content providers, and network service providers, at relatively high data transfer rates at almost any geographic location. Whether digital content distribution occurs over wireline networks, such as fiber-optic and cable networks, or over wireless networks, such as 3 G, WiMAX, LTE, LTE Advanced, or other 4 G cellular networks, the task of increasing communications service capability and maximizing the utilization of existing network communications resources remains a key objective for most network service providers.

Consumer exposure to state-of-the-art digital media content distribution and playback technologies (e.g., tablet computers, netbook and laptop computers, multi-function cellular phones, personal desktop assistant (PDA) devices, electronic book devices, portable gaming devices, etc.) has created a significant demand for improved digital content delivery capability and services. Unfortunately, most service providers have struggled to provide sufficient communications infrastructure to keep up with this growing consumer demand. Presently, there are many different types of data communications networks available that can function independently (e.g., as Local Area Networks or LANs) or collectively as part of a group of interconnected networks (e.g., Wide Area Networks or WANs), such as the World Wide Web. Some of these networks include technologies that facilitate relatively fast, high data rate transmissions (e.g., fiber-optic, cable, and digital subscriber line (DSL) networks), while others can only facilitate much slower data rate transmissions (e.g., 3 G cellular networks). Regardless of a network's type, topology, or employed technologies, almost all modern-day networks are susceptible to congestion or degradation due to a high demand for transferring an alarming amount of digital content between and amongst various network nodes.

As would be understood by those skilled in the art, network congestion generally refers to a state of data transfer overload (a load that burdens network capacity) between links in a data communications network. These heavy loads typically degrade a network's Quality of Service (QOS) and network users' Quality of Experience (QOE). Some negative effects of network congestion, affecting QOS/QOE, may include queuing delay, packet loss, and the blocking of new and existing connections.

Mobile broadband services are becoming very popular in modern society, and almost every teenager and adult in the U.S. owns at least one wireless communications device (e.g., a cellular phone or PDA device). These services can provide a way for individuals to stay connected to the Internet while operating within and roaming between various wireless coverage areas. A concurrent trend is the huge increase in applications and media content distribution services that can facilitate the delivery of large, burdensome media content files to or from user equipment. Large media content file transfers have the signature feature of consuming significant amounts of network resources (i.e., channel bandwidth) over extended periods of time. Further, as is the case with many portable wireless computing devices, these burdensome media content deliveries often consume significant amounts of device resources (i.e., battery power, processor power, volatile and non-volatile memory, etc.). Methods of enabling and making this particular data type delivery less burdensome to the network and its communicating devices are very important to both end users, network providers and service providers. One factor that should be considered in determining how to mitigate congestion and network resource waste is tracking user specific resource usage patterns. This information can be analyzed and utilized in developing improved solutions for burdensome media content delivery.

It has long been observed that humans are creatures of habit. Our daily lives are filled with routines and schedules that rarely vary much within set boundaries. As an example, during a given work week, a typical commuter may travel, more or less, the same physical path from home to work at around the same times of day. As another example, the use of expendable resources that people use on a daily basis is often very predictable. Individuals turn household devices on or off at similar times of the day and they also tend to use communications and computing devices at predictable times and locations (e.g., utilizing both wireline and wireless broadband communications networks). Each of these resource usage events generally fall in line with an individual's daily resource usage patterns, which are defined by personal tendencies, habits, and/or routines.

By way of further example, consider modern computing networks. People tend to use computing resources in defined patterns, which may be based on hourly, daily, weekly, monthly, and even annual usage activities, owing to relatively fixed commuting, work, and lifestyle patterns. However, as individuals move about, it is rarely the case that their access to computing networks is of constant quality and/or efficiency. For example, a user may commute to work each day by train or by bus, and that individual may routinely utilize their laptop computer or PDA device to connect to a particular wireless cellular network (e.g., a 3 G or a 4 G cellular network) to check their work and personal email accounts, while in transit. However, when the user arrives at their office, he or she may routinely connect to the office's local area network to continue using the Internet on a more robust network type (e.g., a fiber broadband network). At the end of the day, the same user may commute back home, temporarily resuming communications via a cellular network (while in transit), and then connect to their personal broadband network after arriving back home (e.g., a cable or WiFi™ network). Each of these networks is likely to have different capacity and capability characteristics, with which its users can utilize to access desired network services. When considering media content deliveries, it would be very beneficial to know, in advance, which network and device resources would likely be available to a user within a predefined period of time from a present instance.

In general, what might be deemed burdensome to one network type (e.g., a 3 G cellular network), such as sending or receiving a large, burdensome data file, may be relatively less so for another type of network (e.g., most fiber or cable networks). Accordingly, it would be beneficial to be able to optimize network usage based on steering burdensome resource usage towards networks that are relatively better suited to handle data delivery tasks that are determined to be burdensome for one or more network resources. To facilitate this functionality, it would be desirable to be able to determine the capabilities of presently available networks as well as to be able to predict soon-to-be available networks (based on individual historical usage patterns). If burdensome resource usage could be allocated to more capable networks, the capacity of relatively less capable networks could be preserved for higher priority data communications tasks, such as voice data communications. This would benefit the users of less robust networks by reducing congestion and thereby improving QOS and a collective network users' QOE.

Another example of how resource conservation could be achieved is by monitoring user device resources (e.g., battery power, processing power, available memory, transmitter status such as 3 G/WiFi, etc.) in conjunction with network resource usage patterns. This is particularly important for modern portable user equipment having media download and playback capability (e.g., tablet computers, netbook and laptop computers, multi-function cellular phones, PDA devices, electronic book devices, portable gaming devices, etc.). If it were known in advance that 1) a user equipment were low on some predefined device resource(s) (e.g., when the device was in a low battery power state); 2) the user equipment was currently roaming; and 3) the user equipment would likely be at a home location within a short period of time (where it could be docked/charged), it may be beneficial to defer or throttle media content deliveries in order to conserve device resources until a time when the user equipment was in a charging state. This could allow a user equipment to delay burdensome operations until a time when battery power could be conserved, such that device battery life could be prolonged and a user could be spared the frustration of running out of battery power while roaming.

This coordinated conservation could reduce the effect that the media content transfer would have on the user equipment during periods when one or more resident device resources was in a state of resource exhaustion (e.g., low battery power, an overburdened processor, or reduced free memory, etc.). By selectively coordinating data content deliveries towards periods when resident device resources are not in a reduced state, more important processes supported by the user equipment (e.g., voice communications, texting, web browsing, etc.) could be prioritized, until a time when sufficient resources become available (e.g., when a user equipment is plugged into a local power supply) for lower priority media content delivery tasks.

Another example of the need for correlating usage patterns to resource usage relates to how communications networks are provisioned to handle periods of peak loading. In general, cellular communications networks are allocated resources based on observed, fixed usage patterns relating to peak periods of network user activity. What is needed is a way of refining these estimates in real time based on determined usage patterns and the ability to predict and proactively make decisions about resource allocation for a given network cell or a group of cell sites. This could allow a network service provider to learn, in advance, when one or more network cells may need additional resources to handle a forecast load.

Accordingly, it would be beneficial to have improved systems and methods for data content delivery that could optimize resource usage by analyzing historical usage information in order to direct resource usage toward times when resource consumption is relatively less burdensome to a particular network or device resource. It would further be advantageous if these systems and methods could operate by automatically detecting, coordinating, and delivering burdensome media content to one or more end receiving device(s), such that a typical user would be unaware of how these underlying resource optimization processes functioned. As a result, an average network user's QOE should improve, while the underlying processes facilitating the improvement would remain transparent. It would further be desirable if these systems and methods could provide predictive alerts to the user or to autonomous resource managers when a proposed resource use is likely to exceed a resource threshold or require additional capacity. This would facilitate a monitoring entity making important, real-time decisions about how to best utilize limited resources based on predefined rules and/or priorities, as well as user preference. These solutions would require observing and recording habitual usage patterns to achieve resource conservation goals that depend on being able to predict where and when users are likely to consume network and device resources.

By aligning media content delivery sessions with historical network usage, service providers would be able to maximize network resources at all times and to prioritize some data communications processes over others (e.g., bulk media content transfers would typically be lower priority data transfers). It would also be helpful if these systems and methods facilitated real time monitoring of resources, such that when local resources (e.g., battery power, processor usage, available memory, etc.) were in a state or resource exhaustion, a media content delivery could be throttled or halted until the resources were replenished or otherwise became available to the user equipment. These dynamic solutions could be utilized to mitigate situations where large media content deliveries would otherwise degrade or impair communications for networks having lesser resource availability.

SUMMARY OF THE INVENTION

This summary is provided to introduce (in a simplified form) a selection of concepts that are further described below in the Detailed Description. This summary is not intended to identify key features of the claimed subject matter, nor is it intended to be used as an aid in determining the scope of the claimed subject matter.

In overcoming the above disadvantages associated with digital data content delivery systems and methods of the Prior Art, the present invention discloses a networked computing system for coordinating the distribution of burdensome media content using historical network usage patterns. The networked computing system includes, but is not limited to, multiple network resources that provide communications service, user equipment, and a data communications network facilitating data communications amongst all communicating devices of the networked computing system. Within the networked computing system, a current reference to a communications location of a user equipment is evaluated to determine if a schedule for a media content transfer session should be modified based on a comparison of the current reference with historical references to one or more prior communications locations of the same user equipment.

In accordance with an aspect of the present invention, when it is determined that the schedule for the media content transfer session should be modified, a preferred network resource and/or a preferred device state is determined for subsequent communications.

In accordance with another aspect of the present invention, the determination for subsequent communications indicates that the preferred network resource and/or the preferred device state facilitates a less burdensome media content delivery than a current serving network resource.

In accordance with a further aspect of the present invention, the modification includes pausing the media content transfer session by halting communications with a current serving network resource and then resuming communications with the preferred network resource at a time when a service of the preferred network resource becomes available.

In accordance with yet a further aspect of the present invention, the comparison further comprises comparing a timestamp associated with the current reference to a plurality of timestamps associated with the historical references for the same user equipment, such that network resource utilization is based on one or more determined chronological patterns.

In accordance with another aspect of the present invention, the user equipment evaluates whether to modify the media content transfer session by comparing the current reference with the historical references and then the user equipment sends an indication to modify the media content transfer session to a network resource controller for further resource usage determinations.

In accordance with yet another aspect of the present invention the current reference to a communications location of the user equipment and the historical references to one or more prior communications locations of the user equipment relate to cell coverage areas where the user equipment has communicated within.

In accordance with an aspect of the present invention is a computer-readable medium encoded with computer executable instructions, which when executed, performs a method comprising processes of: evaluating a current reference to a communications location of a user equipment that is engaged in a media content transfer session, and then determining whether to modify a schedule for a media content transfer session based on a comparison of the current reference with historical references to one or more prior communications locations of the same user equipment.

In accordance with yet another aspect of the present invention, is a computer-implemented method comprising processes of: evaluating a current reference to a communications location of a user equipment that is engaged in a media content transfer session, and then determining whether to modify a schedule for a media content transfer session based on a comparison of the current reference with historical references to one or more prior communications locations of the same user equipment.

BRIEF DESCRIPTION OF THE DRAWINGS

Preferred and alternative examples of the present invention are described in detail below with reference to the following Figure drawings.

DETAILED DESCRIPTION

The present invention relates to systems and methods capable of optimizing media content delivery sessions by evaluating historical resource usage and resource state data, while scheduling one or more burdensome media content deliveries for a particular user or group of users. When performing various scheduling processes, usage patterns may be analyzed in combination with resource efficiency and resource availability information, to improve determinations associated with how particular media content delivery processes should proceed.

In an embodiment, human usage patterns may be recorded in accordance with where and when and what type of resources are routinely consumed. This usage information can be utilized to preferentially reallocate resource use towards periods and locations where media content delivery sessions may be less burdensome to the resource provider, the user, or both. Unlike methods of static usage prediction, the embodiments of the invention are able to identify and respond to transient situations that, while fitting recurrent patterns, generally occur in random sequences. Another advantage associated with the present invention is the ability to correlate groups of users accessing resources, so that communication systems, such as cellular networks, can sufficiently accommodate for predicted transient intervals of peak resource consumption.

Figure 1:
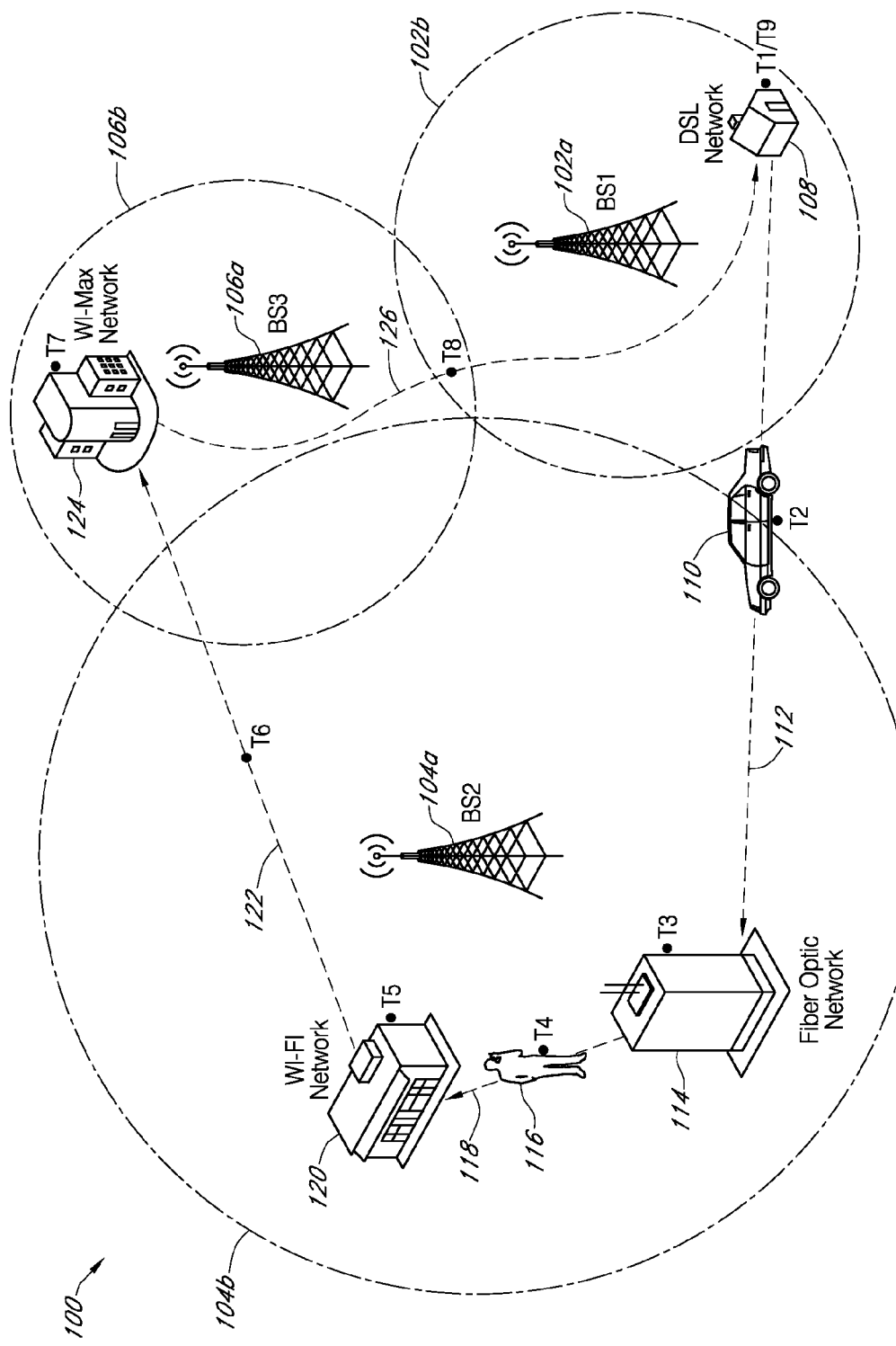
FIG. 1 illustrates a user's routine communications/travel pattern within the topology of a networked computing system, in accordance with an embodiment of the present invention.

To aid in understanding the present invention, a mapping of a user's daily activities is depicted in FIG. 1. Specifically, FIG. 1 depicts the user's routine communications and travel pattern within the topology of a networked computing system 100 over a period of 24 hours. At a starting point T1 (representative of a time within the interval from midnight to 6:30 am), the user can be found at home 108 sleeping, while his Apple® iPhone™ (not shown) is charging, or is residing fully charged, within its custom power cradle. During this time, the phone is generally not being used for voice communications or for any other activities requiring human input. The device's local resources (e.g., battery power, available processing power, available memory, etc.) may be considered to be in a full and/or an available state. Generally, it should be understood that these device resources either digress or vary throughout the course of a given day (e.g., battery power may become depleted, whereas processing power and memory availability may fluctuate). The network available to the user's device at home 108 is a relatively robust DSL network, having significant capacity for large data file transfers that may be deemed burdensome to many cellular networks.

After getting ready for work in the morning, the user retrieves his iPhone™ from its charging cradle and gets inside his automobile 110 to drive to work 114 along path 112. At the time the user starts up his car, his iPhone™ automatically syncs with his vehicle's 110 in-dash communications/navigation system, and subsequently, the user heads off to work 114. Prior to leaving his house 108, the user decides to log on to the Internet with a mobile iTunes™ application stored in the memory of his phone and then he elects to purchase a couple new release "Indite" movies from his preferred web-based media content provider, the Apple® iTunes™ store. The download(s) for the two movies are initiated prior to the user leaving his house 108 and the intelligent, adaptive processes by which the downloads may proceed will be discussed further herein, in accordance with various embodiments of the present invention. At point T2 (representative of a time within the interval from 6:30 am to 7:30 am), the user can be found on a local highway 112, commuting to work 114. This local highway 112 may be the most direct and/or the most efficient path for the user to take to work. Accordingly, the user takes the same path to work every weekday (at approximately the same time). During the commute, the user's iPhone™ may be communicating with either one of two cellular base stations: a micro base station BS1 102a or a macro base station BS2 104a that have defined coverage areas 102b and 104b, respectively. Base stations BS1 102a and BS2 104a may each be 3 G wireless cells that experience moderate to heavy traffic loading during morning commute times, particularly during times associated with "rush hour" traffic. The network communications service available to the user's iPhone™ during this commute is relatively poor for all data transfer activities, except voice calling. At a location and time of day associated with point T2 (or anywhere along path 112), the transfer of large data files would likely be deemed burdensome to the network.

After sitting in traffic for nearly an hour, the user finally arrives at work 114. At point T3 (representative of a time within the interval from 7:30 am to 4:00 pm), while the user is at work, he can generally be found sitting in his office, which is located on an upper floor of a downtown office building 114. While the user is at work 114, his iPhone™ may have access to a high speed fiber broadband network (e.g., via its WiFi™ wireless interface and a private WiFi™ network within the office). The network communications service available to the user's device during this time period is excellent (e.g., offering high data rate service). Accordingly, the transfer of large data files would likely not be deemed to be burdensome to the network; however, a local network controlling entity may or may not have local policies in place to deter network use for web-based activities which are not work related.

Shortly after leaving work 114, the user 116 may commute to his local fitness center 120 along path 118 for his daily workout or exercise routine. It should be understood that mode of transportation may vary without departing from the spirit and scope of the present invention (e.g., travel may be by foot, auto, bus, train, etc.), as long as there are detectable usage patterns that are based on references to location and time. At point T4 (representative of a time within the interval from 4:00 pm to 4:30 pm), the user can be found on a local roadway 118, commuting to "the gym" 120. In general, the user may routinely take the same path to the gym 120, but occasionally he may vary his path (e.g., due to traffic or road construction). During this commute, the user's iPhone™ is again communicating with macro base station BS2 104a, within coverage area 104b. At point T4 (or anywhere along path 118), the transfer of a large data file would likely be deemed to be burdensome to the network, due to time of day and limitations associated with 3 G cellular communications technologies. While the user is at the gym 120, at point T5 (representative of a time within the interval from 4:30 pm to 5:30 pm), the iPhone™ can be found in the user's locker and it may only have access to a local public WiFi™ network, offering limited, unsecure communications service to many public users. Accordingly, at point T5, the transfer of a large data file would likely be deemed to be burdensome to the network, and perhaps ill-advised for security reasons.

After working out at the gym 120, the user may commute to the local University 124, where he or she is enrolled as a student in a part-time evening adult education program, along path 122. At point T6 (representative of a time within the interval from 5:30 pm to 6:00 pm), the user may be located on a highway 122 commuting to "school" 124. The user typically takes the same path to the school 124 every day. During the commute to school, the user's iPhone™ is again in communication with macro cellular base station BS2 104a, within coverage area 104b, as well as with micro base station BS3 106a, having coverage area 106b. During this commute, along path 122, the transfer of a large data file would likely also be deemed to be burdensome to the network for similar reasons stated above for point T2.

Subsequent to the time when the user arrives on campus at the University 124, at point T7 (representative of a time within the interval from 6:00 pm to 9:00 pm), the user can generally be found sitting in class with his iPhone™ in his pocket in "silent mode." While the user is at school 124, his device may have access to a relatively efficient university-wide WiMAX™ network. The network communications service available to the user's device at point T7 may be good, but not excellent. Accordingly, the transfer of large data files using this network would likely not be deemed to be burdensome to the network, unless the University's WiMAX™ network was experiencing periods of heavy traffic.

Next, at point T8 (representative of a time within the interval from 9:00 pm to 9:30 pm) the user may be found on a local highway 126, commuting back home 108 from school 124. This highway 126 may be one of multiple paths the user routinely takes to get back home at the end of a long day. During the commute home, the user's iPhone™ may be receiving communications service from either one of two cellular base stations: micro base station BS3 106a or micro base station BS1 102a that have defined coverage areas 106b and 102b. The network communications service available to the user's device during this commute may have low to moderate levels of communications efficiency. Accordingly, the transfer of large data files during this time span may or may not be deemed burdensome to the cellular network, due to the time of night when the user is commuting back home. Finally, at point T9 (representative of a time within the interval from 9:30 pm to midnight), the user is back at home 108 and his iPhone™ is again docked in its charging cradle to allow the device's battery to recharge for the night. Similar to point T1 (discussed above), during this period, the transfer of a large media content file would not be deemed to be burdensome to the user's home network.

It should be understood that as the day progresses, the user's phone may be continuously loosing charge, or alternately the user may decide to charge his device when at one or more fixed power supply locations (e.g., while in his vehicle or while at work or school), in which case, his device may intermittently gain or lose battery charge. Further, it should be assumed that the user's iPhone™ may also experience periods of decreased processing power or periods of decreased volatile memory availability due to how the user elects to use his device. For example, when the user is running one or more applications and/or GPS navigation on his iPhone™, the device may be utilizing a significant portion of its processing power and its volatile memory resources to facilitate this functionality. In accordance with various embodiments of the invention, whenever a user equipment is determined to be low on some local resource (e.g., battery power, processor power, available memory, etc.), it may be considered to be in a "burdened" state (e.g., a state with one or more depleted device resources). The transfer of large data files during these burdened resource states would likely be deemed detrimental to device efficiency, and if possible, corresponding data transfer session(s) should be delayed or throttled or transferred to a relatively more capable local network (if available) until device resources are no longer in a burdened state.

Figure 2:
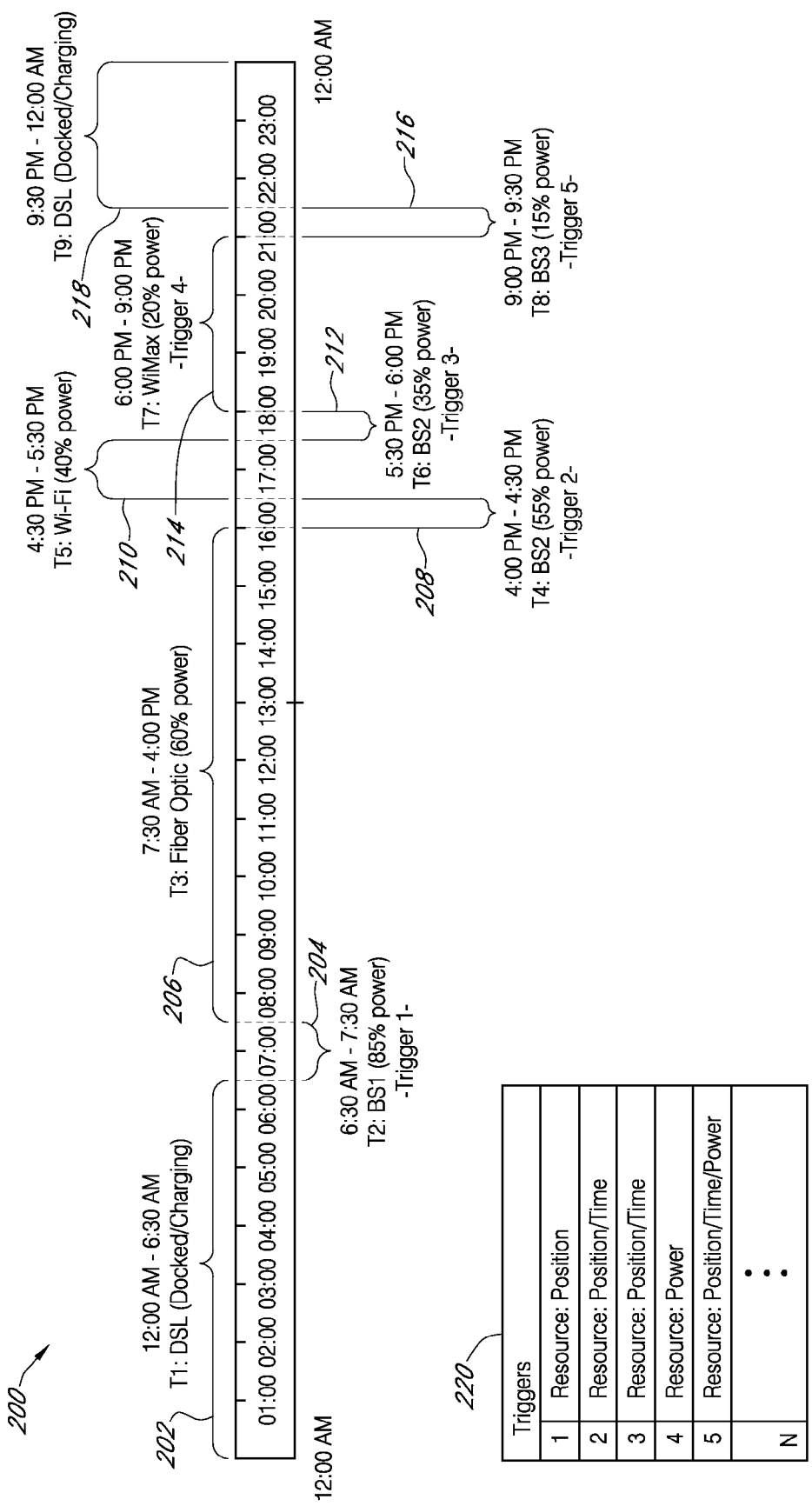
FIG. 2 illustrates a 24-hour resource usage chronology, and a listing of network and device resource triggers associated with the networked computing system of FIG. 1, in accordance with an embodiment of the present invention.

FIG. 2 depicts a 24-hour resource usage chronology 200 (e.g., associated with one or more path profiles, discussed further herein), and a listing of network and device resource triggers 220 associated with the communications and travel pattern within the topology of the networked computing system 100 depicted in FIG. 1. Time span 202 represents the period associated with point T1 of FIG. 1. As noted above, during this time span 202, the user's iPhone™ is docked and charging. In accordance with embodiments of the present invention, there is nothing that would prevent downloads to the device over the home DSL network. Time span 204 represents the period associated with point T2 of FIG. 1. During this time span 204, the user's device's communications service is provided to it by either micro base station BS1 102a or by macro base station BS2 104a. In either scenario, an evaluation process (described further herein) may determine that downloading the two purchased movie data files at point T2 may be burdensome to the network.

In an embodiment, the evaluation process may be enabled by pre-defined triggers (e.g., those listed in table 220). A current reference (e.g., a timestamp, a network attachment ID, a GPS location, information relating to nearby communications resources, etc.) to a present communications location at point T2 may indicate a resource use that can be correlated with a predefined set of triggers/actions stored in a resource use policy database. At point T2, a trigger to a current "position" (e.g., relating to a network attachment ID or a GPS location) in combination with a timestamp data (e.g., a time of day, day of week, calendar month, etc.) may flag point T2 as burdensome to the network. A subsequent mitigation process may make decisions related to determining whether to delay or throttle the media content delivery session(s), based on historical references of past usage data stored in a historical path profile database. For example, after determining a media content delivery is burdensome to the network at a particular time of day, while communications are facilitated by either BS1 102a or BS2 104a, a historical use correlations process (e.g., factoring time of day, day of week, and network attachment ID) may indicate that the user is likely to soon (within a period of less than 1 hour) be connected to a more efficient fiber broadband network (e.g., when the user arrives at work 114), at point T3. In this scenario, it may be beneficial to the network to halt the burdensome media content downloads, until the user connects to the fiber network at work 114.

Time span 206 represents the period associated with point T3 of FIG. 1. As noted above, during this time span 206, the user's iPhone™ is in communications with a high speed fiber network. As would be understood by those skilled in the Art, the iPhone™ could be connected to the fiber network while docked or via a wireless WiFi™ interface. It should be understood that when a choice exists, connection to another type of network (e.g., which may be more capable of handling a data transfer task) may involve predicting the availability of such a network at the user's current location, determining historical connectivity at that location, and autonomously sensing to confirm its presence and availability. In accordance with embodiments of the present invention, there is nothing that would prevent downloads to the device over this network. It should be noted, however, that at point T3 the user's iPhone™ is losing charge (assuming the user has not attempted to recharge their device). By the end of the day at work the device may be at a 60% battery power level, which is not deemed to be problematic.

Time span 208 represents the period associated with point T4 of FIG. 1. During this time span 208, the user's device's communications service is provided to it by macro base station BS2 104a. In this scenario, an evaluation process may determine that downloading either of the two purchased movie files at point T4 may be burdensome to the network. This may be so because the network communications service is poor, the recognized time for commute is short, and the device may have access to a more robust network in the near future.

In an embodiment, the evaluation process may be enabled by pre-defined triggers related to position and time, as well as triggers related to network and device resource states (e.g., some of which are listed in table 220). At point T4, a trigger to a current "position" (e.g., relating to a network attachment ID or a GPS location) in combination with a timestamp data (e.g., a time of day, day of week, calendar month, etc.) may flag point T4 as burdensome to the network. A subsequent mitigation process may make decisions related to determining whether to delay or throttle the media content delivery session(s), based on historical use data stored in a historical path profile database. For example, after determining a media content delivery is burdensome to the network at a particular time of day, while communications are facilitated by BS2 104a, a historical use correlations process (e.g., factoring time of day, day of week, and network attachment ID) may indicate that the user is likely to be connected to a more efficient WiFi™ network (e.g., when the user arrives at the gym 120) at point T5, or to a more efficient WiMAX network (e.g., when the user arrives at school 124), at point T7. In this scenario, assuming that the WiFi™ network at the gym, associated with time span 210, is unsecure (another potential trigger), it may be beneficial to the network to stay the burdensome media content downloads, until the user connects to the WiMAX network at school 124.

Time span 212 represents the period associated with point T6 of FIG. 1. During this time span 212, the user's device's communications service is provided to it by macro base station BS2 104a and by micro base station BS3 106a. In either scenario, an evaluation process may determine that downloading either of the two purchased movie files at point T6 may be burdensome to the network. This may be so because the network communications service facilitated by BS2 104a and BS3 106a is poor, the recognized time for commute is short, and the device may have access to a more robust network in the near future.

The evaluation process may be enabled by pre-defined triggers related to position and time (e.g., as listed in table 220). At point T6, a trigger to a current "position" (e.g., relating to a network attachment ID or a GPS location) in combination with a timestamp data (e.g., a time of day, day of week, calendar month, etc.) may flag point T6 as burdensome to the network. A subsequent mitigation process may make decisions related to determining whether to delay or throttle the media content delivery session(s), based on historical use data stored in a historical path profile database. For example, after determining a media content delivery is burdensome to the network at a particular time of day, while communications are facilitated by BS2 104a, a historical use correlations process (e.g., factoring time of day, day of week, and network attachment ID) may indicate that the user is likely to soon be connected to a more efficient WiMAX network (e.g., when the user arrives at school 124), at point T7. In this scenario, it may be beneficial to the network to defer the burdensome media content downloads, until the user connects to the WiMAX network at school 124.

Time span 214 represents the period associated with point T7 of FIG. 1. During this time span 214, the user's device's communications service is provided to it by a University 124 WiMAX network. In this scenario, an evaluation process may determine that downloading either of the two purchased movie files at point T7 may be burdensome to the iPhone™ device. This may be so because the device's battery power resource is down to 20% of capacity. In accordance with an embodiment of the invention, remaining battery power may be associated with a threshold trigger or action. At point T7, it may be more of a priority to save device resources for more important device communications functions, such as voice calling. Accordingly, the device trigger associated with point T7 and time span 214 would be the device resource of battery power. In this scenario, it may be beneficial to the network to defer the burdensome media content downloads, until the user connects to a resident power supply, where its battery can be recharged Time span 216 represents the period associated with point T8 of FIG. 1. During this time span 216, the user's device's communications service is provided to it by either micro base stations BS3 106a or micro BS1 102a. In this scenario, an evaluation process may determine that downloading either of the two purchased movie files at point T8 may be burdensome to the iPhone™ device and to the network, in accordance with triggers of position, time, and power. This may be so, because the device's battery power resource is down to 15% of capacity at point T8 and the communications capability of the 3 G cells BS3 106a and BS1 102a may be less than ideal. Further, it may also be determined that the travel time from the University 124 to the user's home 108 requires less than a half an hour of travel time, when commuting by car, and that the DSL network at the user's home 108 provides a much more efficient means for the iPhone™ to download media content than either of base station BS3 106a or BS1 102a. In this scenario, it may be beneficial to the network and the device to defer the burdensome media content downloads, until the user docks their device at home 108 in its charging cradle and the home DSL network is available to facilitate more robust communications.

There may also be some scenarios where future network selection includes evaluating conflicting goals (e.g., in terms of completing a network job in the shortest time possible, and determining whether a currently serving network is less capable than another at some future time). For instance, if a data transfer were to take 15 minutes on the current network but only 1 minute on a future network, the transfer would likely be deferred in a case where a future network will be available in near future (e.g., within approximately 30 minutes); however, the same data transfer would likely not be deferred in a case where the future network will be unavailable for a longer time (e.g., a time determined to exceed and resource availability time threshold, such as several hours). Job priority, burden to the network, burden to the device, and job completion time are all variables of a policy that would need to be evaluated for various embodiments of the invention to function.

Figure 3:
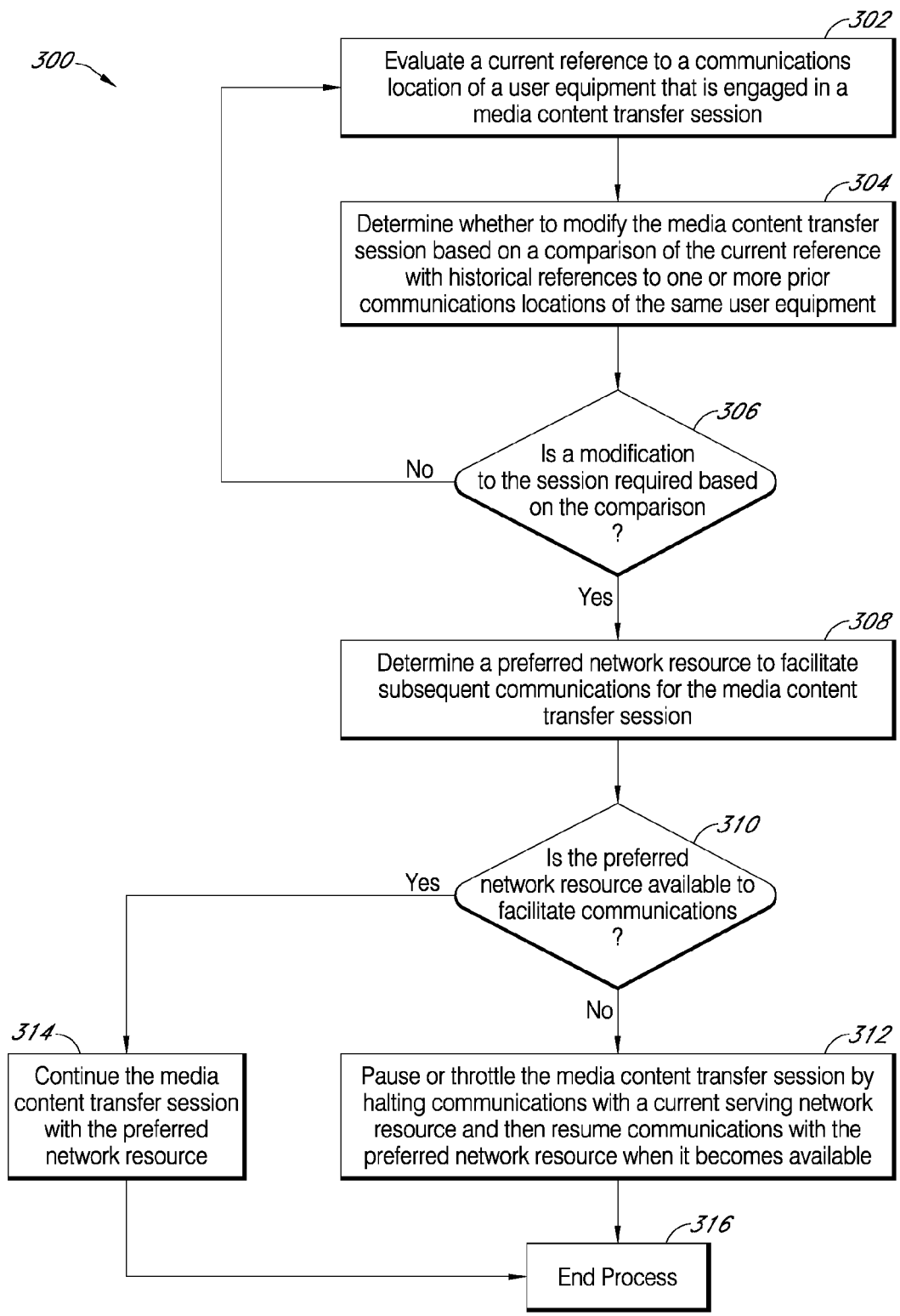
FIG. 3 illustrates a flow diagram depicting adaptive media content delivery processes, in accordance with an embodiment of the present invention.

FIG. 3 illustrates a flow diagram depicting an adaptive media content delivery process 300, in accordance with an embodiment of the present invention. It should be understood that this process 300 could be executed using one or more computer-executable programs stored on one or more computer-readable media located on any of a user equipment (e.g., user equipment 400 and 600) or a network resource controller (e.g., NRC 500), which may be either a network base station (e.g., any of base stations 102a, 104a, and 106a) or some other network controller device common in the Art. These devices may function independently or collaboratively to perform the process 300 of FIG. 3. At block 302, a current reference to a communications location of a user equipment that is engaged in a media content transfer session is evaluated. Then at block 304, it is determined whether to modify the media content transfer session based on a comparison of the current reference with historical references to one or more prior communications locations of the same user equipment. Next, at decision block 306, it is determined if a modification to the media content transfer session is required, based on the comparison. If it is determined at decision block 306 that a modification to the media content transfer session is NOT required, the transfer proceeds unimpeded, until a periodic reevaluation of a current reference is performed at block 302, where after the process repeats.

However, if it is determined at decision block 306 that a modification to the media content transfer session is required, then the process proceeds to block 308, where a preferred network resource is determined to facilitate subsequent communications for the media content transfer session. Next at decision block 310 it is determined if the preferred network resource is available to facilitate subsequent communications. If it is determined at decision block 310 that the preferred network resource is available to facilitate subsequent communications, then at block 314, the media content transfer session continues with the preferred network resource. In an embodiment, the content transfer session switch to a preferred network resource may involve detection of the preferred network and enabling the device on that preferred network (with or without direct user involvement or notification). In an embodiment, whether the preferred network resource is available may involve determination of the current network status including sufficient idle resource capacity to facilitate subsequent communications. After the download completes at block 314, the process ends at block 316. However if it is determined at decision block 310 that a the preferred network resource is NOT available to facilitate subsequent communications, then the process proceeds to block 312 where the media content transfer session is either paused or throttled (temporarily) by halting communications with a preferred network resource and then resuming communications with the preferred network resource when it becomes available. Subsequently, the process ends at block 316.

In accordance with various embodiments of the invention, it should be understood that the functionality of being able to detect where user equipment is located (e.g., via satellite or terrestrial radio location based services) is a requirement for the invention to operate, although tracking user location need not be continuous or ubiquitous for location and route estimations. Another requirement is the ability to track when and how long users reside at various geographic locations. This is necessary in order to be able to build a store of path profiles (historical references) that may be used as "fingerprints" to identify routes and predicted destinations for user equipment determined to be stationary or roaming. Still another requirement of the invention is the ability to identify which types of resources are available at which locations. In an embodiment, this can be facilitated by network attachment Ds and/or by neighboring cell site location information. Knowledge of these resources is crucial to be able to predict when a resource usage request should be postponed (e.g., until a time when the user is in a better location to efficiently utilize a network or device resource). In an embodiment, solutions associated with the present invention may be able to determine anticipated resource loading (e.g., how burdensome a particular operation will be based on file size, transfer duration, processor load, battery draw, etc.).

In an embodiment, the invention may function in accordance with the following core processes: 1) Record and build path profiles: a user's device location and time may be monitored at predetermined intervals during the day and stored as path profiles (e.g., over a 24 hour period). Missing data may be recorded as unknown locations; 2) Identify path instances based on recorded path profiles: path instances may be correlated with known profiles and either stored as a new path profile or matched against a previous profile. Matching can imply partial or similar sequence correlation of a path instance to a previously known path profile with an associated match confidence metric; 3) Identify burdensome operations: User equipment operations may be monitored and compared to various thresholds to determine if a proposed resource use is likely to be burdensome to the current resource provider (e.g., a wireless network operator) or to the user equipment. Candidate operations may be categorized according to the need for real-time resource utilization (e.g., a voice call or an email file send). Identified operations may be deferred, pending potential intervention; 4) Predict resource optimization opportunities: Based on the user's matched path profile(s), future opportunities to more efficiently allocate resources to serve the identified operations may be predicted. Predictions can be based on a set of rule criteria that in general vary according to the proposed resource utilization; 5) Modify resource use to optimized locations and times (alternatively change available resource configuration): Selectively identified burdensome operations may be paused until the user equipment is in a location where it can communicate relatively more efficiently (e.g., with less burden to a network resource provider, the user, or both). Alternatively, resources may be reconfigured to meet predicted intervals when users may be in position to use the resources in a more efficient manner.

Figure 4:
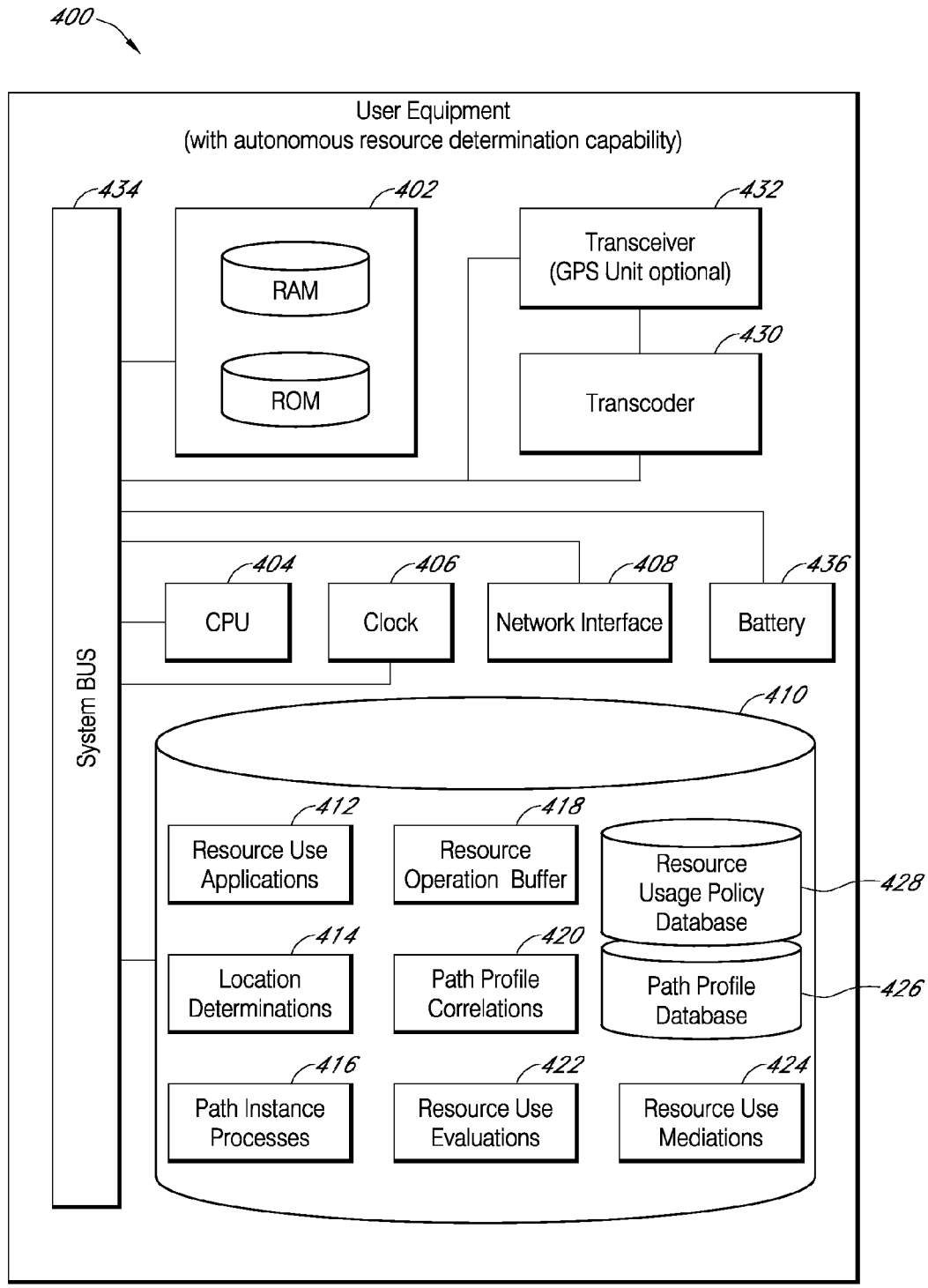
FIG. 4 illustrates block diagram view of a user equipment having autonomous resource usage determination capability, in accordance with an embodiment of the present invention.

FIG. 4 shows a block diagram view of a user equipment 400 (having autonomous resource determination capability) in accordance with an embodiment of the invention. The user equipment 400 may include, but is not limited to, one or more processor devices including a central processing unit (CPU) 404. In an embodiment, the CPU 404 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 404 is responsible for executing all computer programs stored on the user equipment's 400 volatile (RAM) and nonvolatile (ROM) system memories, 402 and 410.

The user equipment 400 may also include, but is not limited to, a clock 406 that allows it to accurately track times (e.g., for creating timestamps) associated with profile instances (discussed further herein); a battery 436 that allows the device to operate while roaming; a network interface 408 that facilitates interactions with other devices of the networked computing system 100; a software/database repository 410 including: resource use applications 412, a location determinations component 414, a path instance processes component 416, a resource operations buffer 418, a path profile correlations component 420, a resource use evaluations component 422, a resource use mediations component 424, a resource usage policy database 426, and a path profile database 428; a transcoder 430 for formatting data communications prior to transfer; a transceiver 432 (optionally comprising a GPS unit) for transmitting and receiving network communications; and a system bus 434 that facilitates data communications amongst all the hardware resources of the user equipment 400.

In an embodiment, the user equipment 400 may carryout processes to monitor, record, and manage path instances (also referred to herein as a "reference to a current location") via the path instance processes component 416. In an embodiment, path instances may be defined as a particular sequence of path variables relating to position (e.g., a geographic location, a network cell attachment ID, a GPS coordinate, etc.), time (e.g., a timestamp indicating a time of day, day of week, calendar month, etc.), resource state (e.g., a state of network congestion, or user equipment battery power, available processor power, available memory, etc.). In an embodiment, path instances may be associated with a fixed time period (e.g., such as 24 hours), and they may be stored as a path profile in the path profile database 426. The path profile correlation component 430 can determine whether a current path instance determined by the path instance processes component 416 matches one or more previously recorded and stored path profiles in the path profile database 426, or whether the path instance is a new candidate for being added to the path profile database 426. In another embodiment, the processes associated with the path profile correlation component 430 of the user equipment 400 could reside at a separate computing entity that may be networked with the user equipment 400 in order to reduce the computational load for a user's mobile device.

In an embodiment, the resource use evaluations component 422 can monitor how the resource use applications 412 utilize the resident resources of the user equipment 400. The resource use evaluations component 422 may consults a predetermined set of triggers and/or actions (See e.g., the triggers of table 220 of FIG. 2) that are stored in the resource usage policy database 428 to determine which resource uses are determined to be burdensome to a resource being requested by the resource use applications 412. In an embodiment, identified burdensome resources may be flagged to a resource use mediations component 424 that can execute processes to mitigate the impact of pending resource use. In accordance with various embodiments of the present invention, mitigation actions may include delaying, throttling, or asking a user for a revised course of action for the pending burdensome resource use (e.g., use generally associated with one or more burdensome media content deliveries).

In an embodiment, mitigation may involve caching resource operations in a resource operations buffer 418 for later execution. This may result in interactions with the resource use applications 412 for coordinating resource use mitigation by the application directly. It should be understood that any of the processes associated with the components of the software/database repository 410 (e.g., the resource use applications 412, location determinations component 414, path instance processes component 416, resource operations buffer 418, path profile correlations component 420, resource use evaluations component 422, or the resource use mediations component 424), may be consolidated or distributed (amongst one or more network devices) without departing from the spirit and scope of the present invention.

Figure 5:
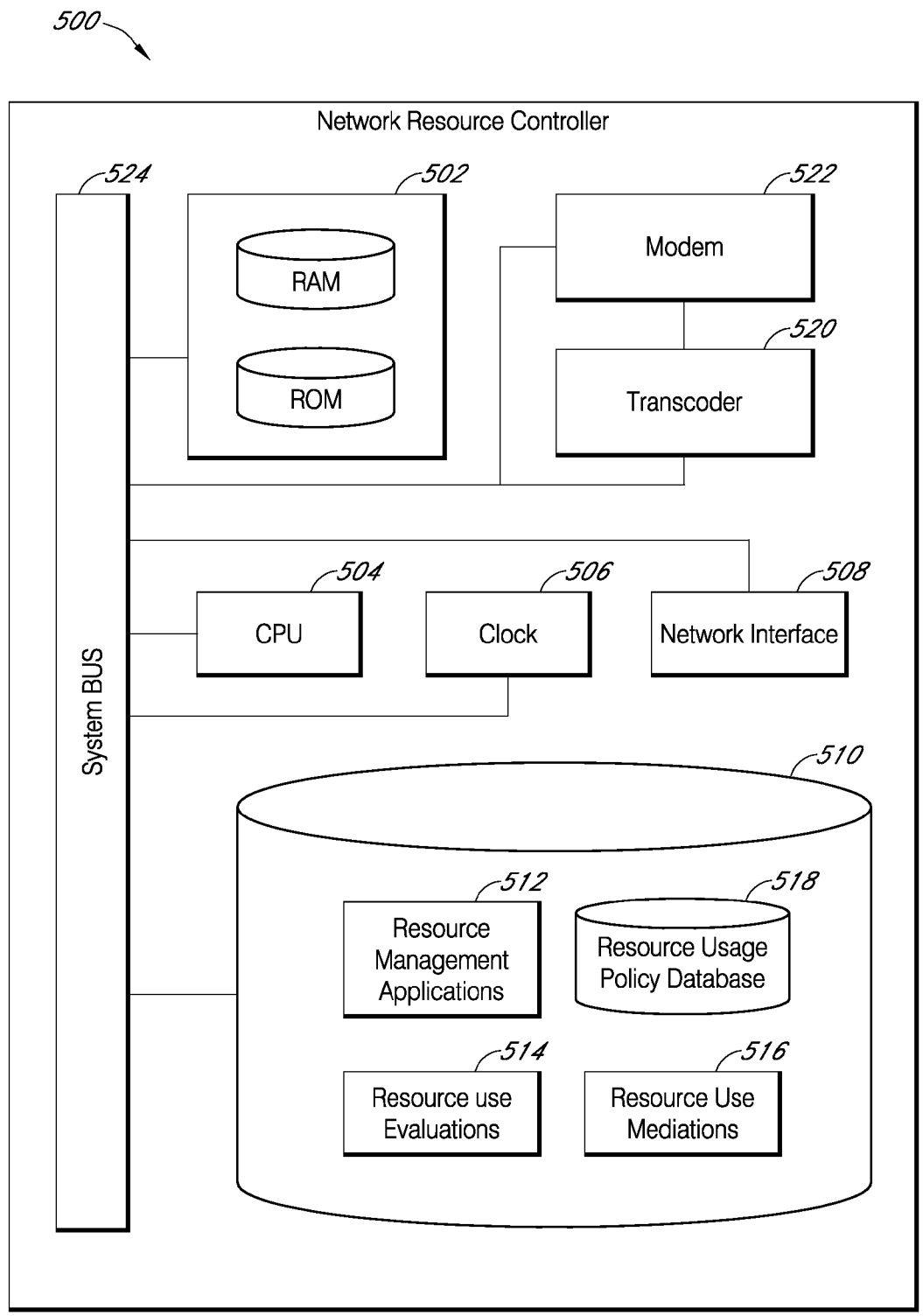
FIG. 5 illustrates a block diagram view of a network resource controller having resource usage determination capability, in accordance with an embodiment of the present invention.

FIG. 5 illustrates a block diagram view of a network resource controller (NRC) 500 having resource usage determination capability, in accordance with an embodiment of the present invention. The NRC 500 may include, but is not limited to, one or more processor devices including a central processing unit (CPU) 504. In an embodiment, the CPU 504 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 504 is responsible for executing all computer programs stored on the NRC's 500 volatile (RAM) and nonvolatile (ROM) system memories, 502 and 510.

The NRC 500 may also include, but is not limited to, a clock 506 that allows it to accurately track times associated with usage pattern recognition and mediations processes a network interface 508 that facilitates interactions with other devices of the networked computing system 100; a software/database repository 510 including: a resource management applications component 512, a resource usage evaluations component 514, a resource use mediations component 516, and a resource usage policy database 518; a transcoder 520 for formatting data communications prior to transfer; a modem 522 for transmitting and receiving network communications; and a system bus 524 that facilitates data communications amongst all the hardware resources of the NRC 500.

Figure 6:
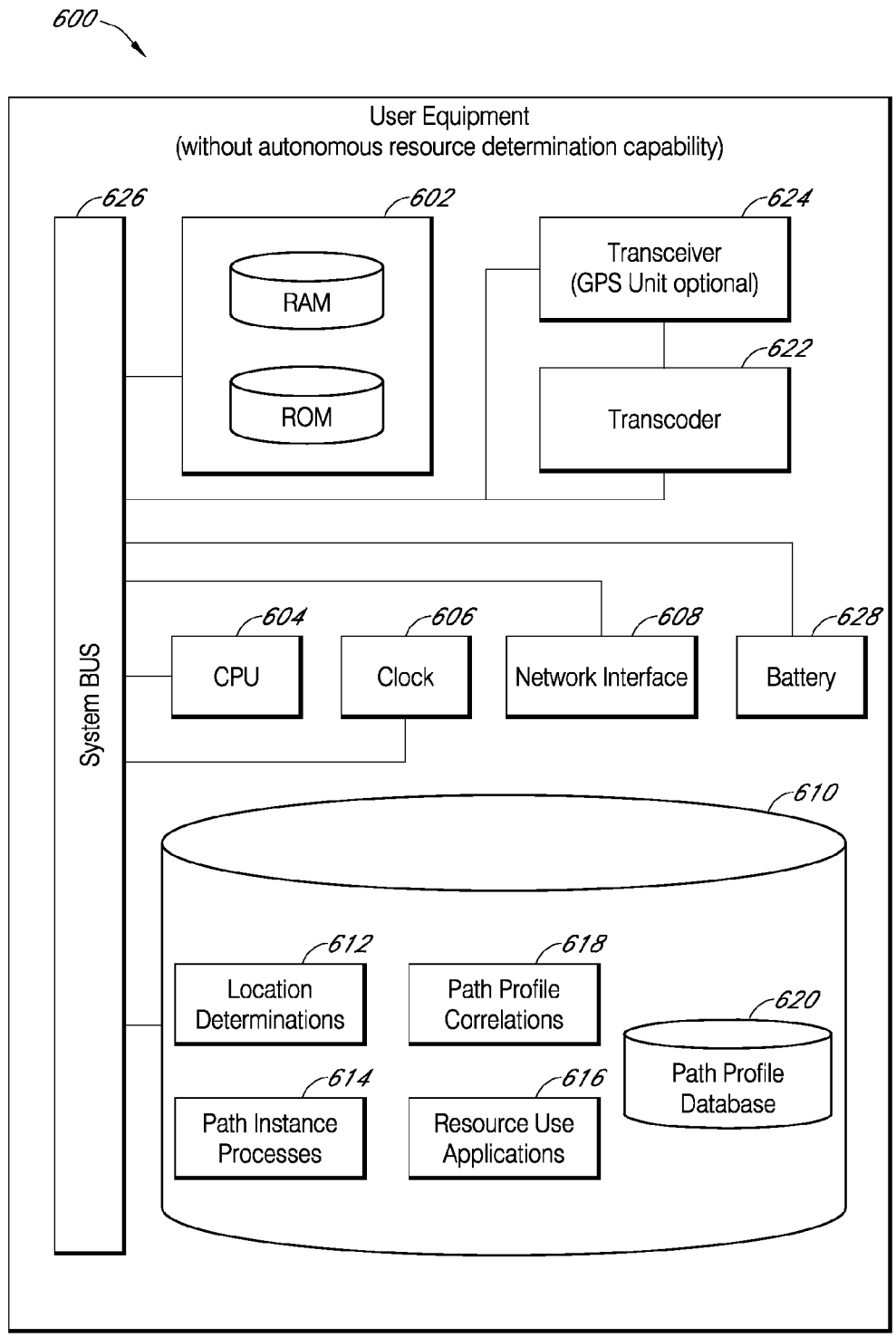
FIG. 6 illustrates a block diagram view of a user equipment without autonomous resource usage determination capability, in accordance with an embodiment of the present invention.

FIG. 6 illustrates a block diagram view of a user equipment 600 without autonomous resource usage determination capability, in accordance with an embodiment of the present invention. The user equipment 600 may include, but is not limited to, one or more processor devices including a central processing unit (CPU) 604. In an embodiment, the CPU 604 may also include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 604 is responsible for executing all computer programs stored on the user equipment's 600 volatile (RAM) and nonvolatile (ROM) system memories, 602 and 610.

The user equipment 600 may also include, but is not limited to, a clock 606 that allows it to accurately track times (e.g., for creating timestamps) associated with profile instances; a battery 628 that allows the device to operate while roaming; a network interface 608 that facilitates interactions with other devices of the networked computing system 100; a software/database repository 610 including: a location determinations component 612, a path instance processes component 614, a resource operations buffer 616, a path profile correlations component 618, and a path profile database 620; a transcoder 622 for formatting data communications prior to transfer; a transceiver 624 (optionally comprising a GPS unit) for transmitting and receiving network communications; and a system bus 626 that facilitates data communications amongst all the hardware resources of the user equipment 600.

In an embodiment of the invention there may be multiple entities or network devices that collaborate to carry out various processes associated with the present invention. For example, FIG. 5 and FIG. 6 depict two such cooperating devices: the NRC 500 and user equipment 600, which may communicate with each other over any combination of wireline, fiber or wireless broadband networks. In an embodiment, the NRC 500 may control resources being utilized by one or a plurality of user equipment (e.g., represented by user equipment 600). It should be understood that both the NRC 500 and the user equipment 600 have basic functionality necessary to operate/control their respective hardware components (e.g., CPUs 504 and 604, clocks 506 and 606, network interfaces 508 and 608, etc.).

In an embodiment, the user equipment 600 may run a location determinations process via locations determinations component 612, that allows the device 600 to determine its position as it roams in accordance with various common mobility scenarios (e.g., those discussed above for FIG. 1). The user equipment 600 may run a process to monitor, record, and otherwise manage path instances associated with the path instances processes component 614. As noted above, these path instances may be defined as a particular sequence of path variables relating to position (e.g., a geographic location, a network cell attachment ID, a GPS coordinate, etc.), time (e.g., a timestamp indicating a time of day, day of week, calendar month, etc.), resource state (e.g., a state of network congestion, or user equipment battery power, available processor power, available memory, etc.). Path instances may be stored or cached, while the path profile correlations component 618 determines when the path instance matches one of a previously recorded path profile in the path profiles database 620. Alternately, the path profile correlations component 618 may determine that the path instance is a new candidate for being added to the path profile database 620.

In an embodiment, the path profile correlations component 618 may periodically communicate with the NRC 500 to inform its resource use evaluations component 514 of a current recognized path instance, including the user equipment's 600 current position within the path profile sequence and its current and/or anticipated resource application uses 616. The NRC 500 may run resource management applications 512 that can manage and control resources associated with a service provider's network. The resource use evaluations component 514 may communicate with one or a more user equipment (e.g., represented by user equipment 600) to evaluate whether a current or a future set of resource uses will be burdensome to the network service provider (e.g., based on collected path profiles).

In an embodiment, the resource use evaluations component 514 can consult a predetermined set of triggers and/or actions that are stored in the resource usage policy database 518, in order to determine which resource uses should be recognized as burdensome to a resource being requested by particular user equipment 600. Identified burdensome resources may be flagged to a resource usage mediations component 516 that can execute actions to mitigate the impact of pending resource use. In some embodiments, mitigation actions may include delaying, throttling, or asking a user for a revised course of action for pending burdensome resource use. In an embodiment, resource use may result in altering resource allocations using one or more resource management applications 512 that are controlled by the NRC 500.

Figure 7:
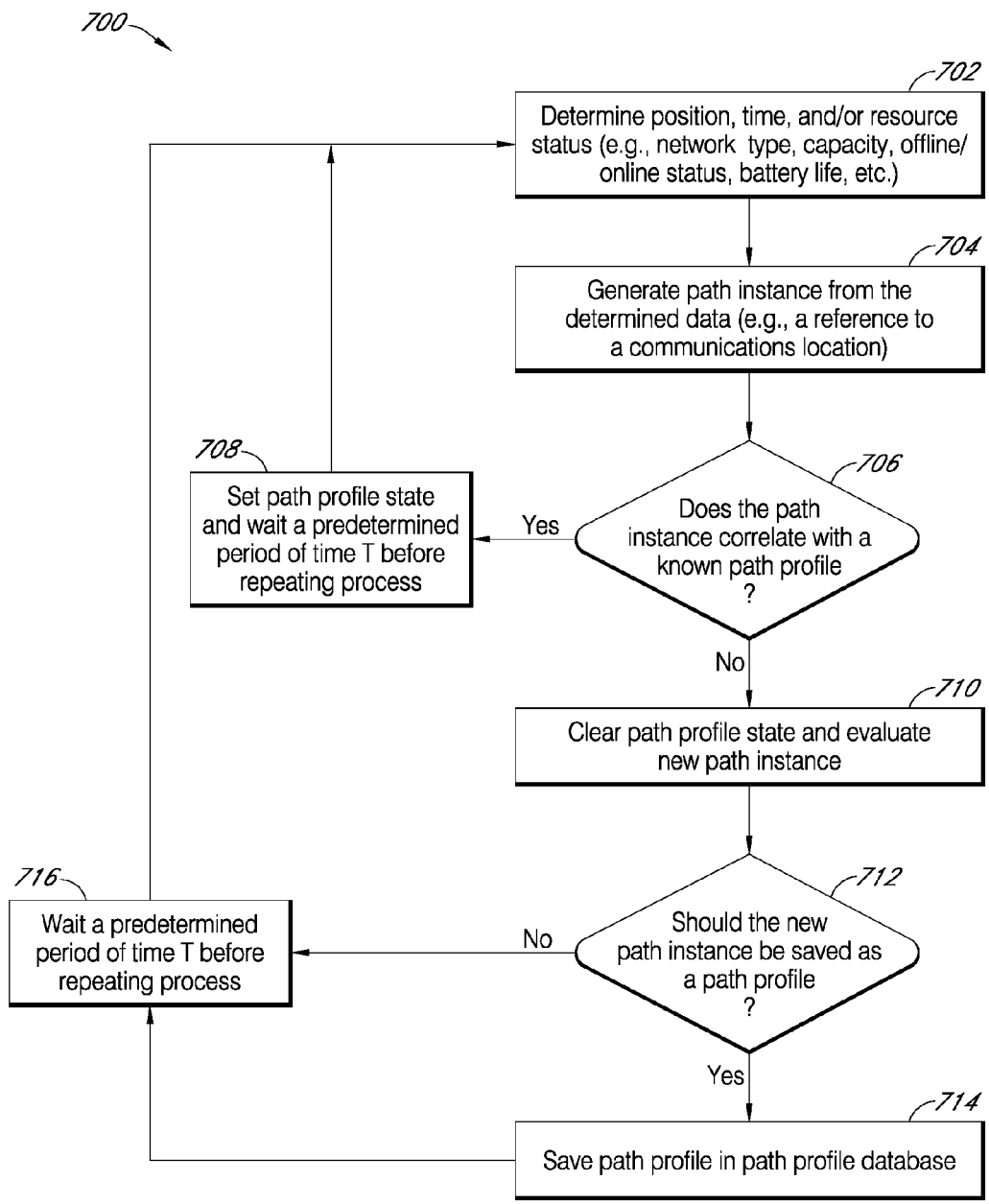
FIG. 7 illustrates a flow diagram of depicting path profiling processes associated with resource optimization, in accordance with an embodiment of the present invention.

FIG. 7 illustrates a flow diagram depicting a path profiling process 700 associated with resource optimization, in accordance with an embodiment of the present invention. In particular, process 700 relates to building path profiles by collecting and recording path instances associated with previously recorded path profiles. It should be understood that this process 700 could be executed using one or more computer-executable programs stored on one or more computer-readable media located on any of a user equipment (e.g., user equipment 400 and 600) or a network resource controller (e.g., NRC 500), which may be either a network base station (e.g., any of base stations 102a, 104a, and 106a) or some other network controller device common in the Art. These devices may function independently or collaboratively to perform the process 700 of FIG. 7. At block 702, a position (e.g., a network attachment ID, GPS position, etc.), time (e.g., a timestamp including time of day, day of week, or calendar month), and/or resource state status (e.g., network type, capacity, offline/online status, battery life, processor power, memory availability, whether a mains power supply presence, etc.) are determined.

It should be understood that position should include sufficient information and precision to indicate geographic location and network attachment corresponding to the current time. It should be understood that location is an important aspect of the present invention as: 1) a means of determining where a user is going, based on past sequences of positional changes; and as 2) a means of correlating which resources and capabilities are available and used at a given position. Time stamps, as discussed herein may include time of day, day of week, and calendar month data, sufficient to enable recognition of periodically recurring path patterns that may be found to occur on an hourly, daily, weekly, monthly, or annual basis. Next at block 704, a path instance is generated from the determined data (e.g., a reference to a communications location). Then at decision block 706 it is determined if the path instance correlates with a known path profile. If at decision block 706 it is determined that the path instance correlates with a known path profile, then the process proceeds to block 708, where a path profile state is set; then the process waits a predetermined period of time T, before the process is repeated the at block 702. However, if at decision block 706 it is determined that the path instance does NOT correlate with a known path profile, then at block 710 the path profile state is cleared and the new path instance in evaluated.

Subsequently, the process proceeds to decision block 712, where it is determined whether the new path instance should be saved as a path profile in the path profile database. If at decision block 712, it is determined that the new path instance should be saved as a path profile in the path profile database, then the process proceeds to block 714, where the path instance is saved in the database. Subsequently, the process proceeds to block 716 where the process waits a predetermined period of time T before it is repeated at block 702. However, if at decision block 712, it is determined that the new path instance should NOT be saved as a path profile in the path profile database, then the path instance is not saved, and the process proceeds to block 716 where the process waits a predetermined period of time T before being repeated at block 702. In an embodiment, path data may be appended to a temporary path instance data base or buffer, which can store parameters sorted for example by time order. To limit the amount of required storage, the data base may be limited to a size suitable to store a finite time span such as 24 hours.

In an embodiment, a process may perform pattern recognition on sequences of points associated with a path instance. The process may attempt to correlate sequences of points in an active path instance with one or more previously stored path profiles. In an embodiment, the process of pattern recognition may have an associated confidence parameter calculated, which may be proportional to the number of points in the path instance that are "near" to the matching sequence in a particular path profile as well as the degree of "nearness" associated with each point. It should be understood that one or more pattern recognition algorithms may be employed to fit particular types of usage patterns and varying methods may be implemented to match (loosely or closely) differing usage scenarios, without departing from the spirit and scope of the present invention. It should also be understood that a variety of pattern matching criteria could be used for determining pattern matches, without departing from the spirit and scope of the present invention.

In an embodiment, when a path instance is matched to a portion of a path profile, the identity of the path profile may be stored as the state of a current path traversal. Subsequently, the process may sleep for a predetermined period of time before repeating the process of recording a new path data point. In an embodiment, when a path instance is not recognized, the entity running the process is assumed to be traversing a new path and the state of a current path traversal may be cleared.

Next, the process may determine whether the current path instance should be saved as a path profile. For example, if there are sufficient contiguously recorded points recognized, a new path may be recorded. Alternately, other criteria, such as duration or length of time in a single location, may be used as a determination criterion. In an embodiment, if a decision is made to save a portion of a path instance, the path profile may be given a unique identity and then it may be stored in a data base for future retrieval. The process may then enter a sleep state. In an embodiment, if the decision is to not save a the current path instance, the process proceeds to the sleep state for a predetermined period of time before repeating the process of recording a new path data point.

Figure 8:
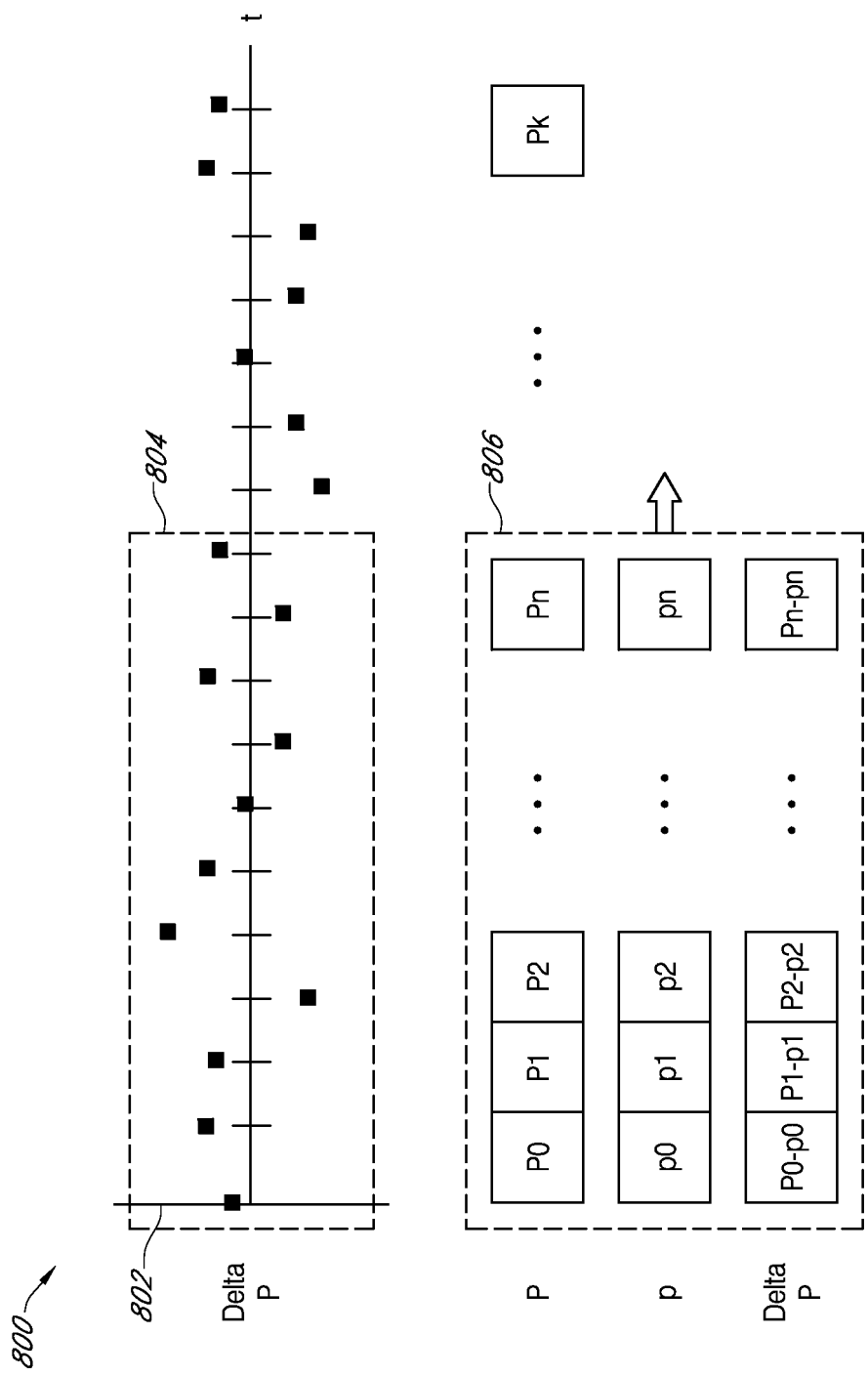
FIG. 8 illustrates a diagram depicting path instance to path profile correlation processes associated with resource optimization, in accordance with an embodiment of the present invention.

FIG. 8 illustrates a diagram depicting path instance to path profile correlation processes 800, associated with resource optimization, in accordance with an embodiment of the present invention. In FIG. 8, a path profile is represented by a sequence of path points 806 (e.g., path profile point sequence: P0, P1, P2 . . . Pk) according to stored values in a path profile database. For example, the path profile could relate to a period of a few hours, 24 hours, 1 week, 1 month, etc. In an embodiment, a path instance may consist of a sequence of observed path points (e.g., path instance point sequence: p0, p1, p2 . . . pn), which can be compared with a corresponding durational sequence of a path profile 806.

In an embodiment, the difference between the path profile point sequence P0, P1, P2 . . . Pn and path instance point sequence p0, p1, p2 . . . pn (over a set interval 806) may be computed to determine the delta P0-p0, P1-p1, P2-p2, Pk-pn, or variances between the path sequences. This delta is plotted in Delta P plot 802 over a predetermined interval 804 corresponding with interval 806. In an embodiment, the difference between GPS position and network attachment ID may represent the Euclidean distance between the corresponding path instance and path profile points. A correlation quality metric Q may be computed by summing the absolute value of the P-p deltas and multiplying the resultant sum by a weighting function (e.g., 1/n) proportional to the number of points in the correlation sequence. In some scenarios a minimum set of n path instance points is required in order to obtain a valid quality metric. The following correlation quality metric equation eq. 1 depicts one possible mathematical solution associated with the above determinations:

$$\sum_{i=0}^{n} \text{ABS}(Pi - pi) = dP \to dP \times \text{Weight}(n) = Q \quad \text{(eq. 1)}$$

In an embodiment, the correlation quality metric Q is a measure of how "near" the current path instance p is to the path profile P over a time interval represented by the length of the path instance. It should be understood that the path instance interval could be modified along the path profile in order to discover optimal path correlations that differ only in time.

In an embodiment, the correlation quality metric is ideally zero if the path instance sequence p perfectly correlates with the path profile sequence P over the measured interval 124. In an embodiment, a threshold (Q<threshold) may be used to determine whether the correlation is of sufficient accuracy to determine a path instance match to a path profile. In some scenarios, the correlation of a path instance to multiple stored path profiles might be of equal quality. In those cases, prediction of future path traversal may only be valid up to a branching point where the path profiles diverge from one another. If a match is discovered between a path instance and a path profile, future path profile points (e.g. n+1, n+2, n+3,) may be used in conjunction with resource status points to make determinations with respect to current and future resource usage.

Figure 9:
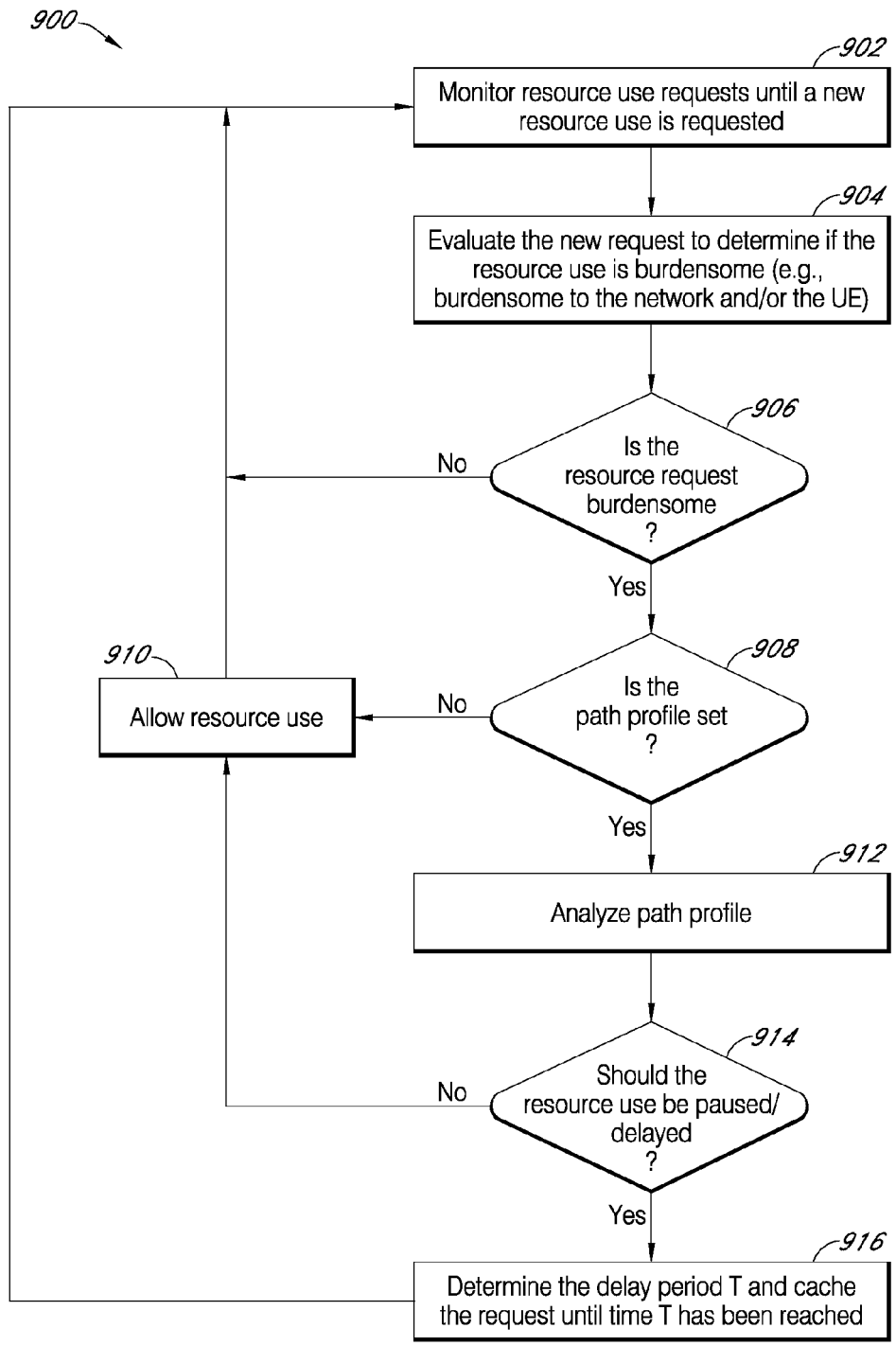
FIG. 9 illustrates a flow diagram depicting burdensome resource request determinations associated with resource optimization, in accordance with an embodiment of the present invention.

FIG. 9 illustrates a flow diagram depicting burdensome resource request determinations 900 associated with resource optimization, in accordance with an embodiment of the present invention. It should be understood that this process 900 could be executed using one or more computer-executable programs stored on one or more computer-readable media located on any of a user equipment (e.g., user equipment 400 and 600) or a network resource controller (e.g., NRC 500), which may be either a network base station (e.g., any of base stations 102a, 104a, and 106a) or some other network controller device common in the Art. These devices may function independently or collaboratively to perform the process 900. At block 902, resource usage is monitored until a new resource use request is detected. Then at block 904, the new resource use request is evaluated to determine if the resource use is burdensome (e.g., burdensome to the network, the user, or both).

Subsequently, at decision block 906, it is determined if the resource request is burdensome. If the resource request is determined NOT to be burdensome at decision block 906, then the process reverts back to block 902, for further monitoring. However, if the resource request is determined to be burdensome at decision block 906, then the process proceeds to decision block 908 where it determined if the path profile is set. If the path profile is determined NOT to be set at decision block 908, then the resource use is allowed at block 910, and the process reverts back to block 902 for further monitoring. However, if the path profile is determined to be set at decision block 908, then the process proceeds to block 912 where the path profile is analyzed.

Next, at decision block 914, it is determined if resource use should be paused or delayed. If it is determined at decision block 914 that resource use should be paused or delayed, then at block 916 the delay period T may be determined and the resource request is cached until the predetermined time T has been reached. Subsequently, the process reverts to block 902 for further monitoring. However, if it is determined at decision block 914 that resource use should NOT be paused or delayed, then at block 910 the resource use is allowed at block 910, and the process reverts back to block 902 for further monitoring.

In an embodiment, a process associated FIG. 9 begins by monitoring resource use requests. The process may loop in this state until there is a request that will use a resource, such as network access by an application. When a resource use is determined to not be significant the process may again loop. On the other hand, if the resource use is predicted to be burdensome the process generally proceeds. In accordance with an embodiment of the invention, a resource may be determined to be burdensome if the resource use will consume a significant amount of the resource, either by fractional (or percentile) amount of usage, a duration of usage, or both. If path profile state is not set to a recognized path traversal, a proposed resource use may be allowed and the process can repeat by waiting for the next resource use request.

In an embodiment, if the path profile state is set (e.g., identifying a stored path profile instance), a determination is made as to whether a pending resource use should be delayed to run in the future or throttled. If no resource usage modification is necessary, the resource use is permitted, and the process loops back, awaiting a new resource use request. In an embodiment, determinations of candidate resource use operations that should be delayed may be based on current path profile information and by examining future path profile data points for opportunities of more efficient and less burdensome resource use.

If, based on examining a current path profile, it is determined that the pending resource use should not be modified, the process loops back to the beginning. If it is determined that a pending resource use should be modified (e.g., delayed), then a delay interval T is determined and the resource use request is cached, until a time T has been reached. After the request is cached the process loops back to the beginning, awaiting a new resource use request.

In accordance with various embodiments of the invention, at least the following scenarios would be enabled by solutions associated with the present invention. In a first scenario, a user begins his daily commute at the train station. He accesses a local wireless network and uses his netbook handheld PC to check his work email. After reading an e-mail indicating that a co-worker wants to receive a copy of a large report that the user has stored in the memory of his mobile device, the user attaches the report to an email reply and hits send. A solution associated with processes of the present invention may determine the user's current position, via a recurrent usage pattern identification mechanism, and then predict that the user will be able to connect with a high-speed wired network within 40 minutes, upon arriving at work. The email send operation may be cached and/or throttled until the user reaches work where transmittal is completed. This resource conservation hypothetical illustrates an example where both battery capacity and network capacity are preserved during the commute.

In accordance with a second scenario, a user is with a group of her friends shopping at a local mall, when she decides to send another friend a video of the group's activities. The user records the video and hits send from her mobile device. A solution associated with the present invention detects the user's position at the mall and the fact that it is Saturday in the afternoon. In accordance with this information, the solution predicts that the user will likely be home in a few hours. Because a sensed remaining battery capacity is low the transmittal of the video is paused and the transmit action is cached or throttled until the user reaches home, a short while later.

This effectively reduces the risk that the user will have their phone temporarily incapacitated from battery exhaustion while roaming.

In accordance with a third scenario, a mobile cellular provider may supply coverage to a large sports stadium. A solution associated with the present invention detects each customer's cell phone as they approach the stadium and then predicts, based on number of approaching users that additional cellular radio resources will be required to cover anticipated communications load during a time associated with an upcoming game. The invention provides a system alert in advance of the peak usage, such that autonomous management routines can prepare and/or reallocate radio resources near the stadium (which could be in low-power idle mode in order to save energy) to handle the transient load, thereby avoiding network capacity overload. At the same time, network users' lower priority operations (e.g., those that are not time sensitive, such as sending burdensome media content) may be delayed until users return home and connect to higher capacity networks.

While several embodiments of the present invention have been illustrated and described herein, many changes can be made without departing from the spirit and scope of the invention. Accordingly, the scope of the invention is not limited by any disclosed embodiment. Instead, the scope of the invention should be determined from the appended claims that follow.

The embodiments of the invention in which an exclusive property or privilege is claimed are defined as follows:

1. A networked computing system for coordinating the distribution of burdensome media content using historical network usage patterns, the networked computing system comprising:
    a plurality of network resources that provide communications service, each network resource being associated with a communications location and a network capacity;
    a network resource controller;
    a first user equipment associated with a first network usage pattern including one or more prior communications locations from where the first user equipment had utilized the network resources;
    a second user equipment associated with a second network usage pattern including one or more prior communications locations from where the second user equipment had utilized the network resources;
    a data communications network facilitating data communications amongst all communicating devices of the networked computing system; and
    a non-transitory computer-readable medium encoded with computer executable instructions, which when executed, performs a method comprising:
        evaluating a current reference to a first communications location of the first user equipment that is engaged in a media content transfer session at the first communications location, the first communications location being associated with a first network resource having a first network capacity; and
        determining whether to modify a schedule for the media content transfer session to the first user equipment based on a comparison of the current reference with the first network usage pattern of the first user equipment, and
    wherein the modification involves pausing the media content transfer session by halting a use of the first network resource to communicate with the first user equipment and then resuming communications with the first user equipment by using the second network resource.

2. The networked computing system of claim 1, the method further comprising:
    selecting a second communications location from the first network usage pattern for subsequent scheduling of the media content transfer session to the first user equipment, the second communications locations being associated with a second network resource having a second network capacity that is different from the first network capacity.

3. The networked computing system of claim 2, wherein the second communications location is selected for subsequent scheduling of the media content transfer session to the first user equipment if the first network usage pattern indicates that the first user equipment has a preferred communications location or a preferred device state for the media content transfer session that would impose a reduced load on the network resources.

4. The networked computing system of claim 1, wherein the comparison further comprises comparing a timestamp associated with the current reference to a plurality of timestamps associated with the first network usage pattern for the first user equipment, such that network resource utilization is based on one or more determined chronological patterns.

5. The networked computing system of claim 1, wherein the non-transitory computer-readable medium is included in the first user equipment, the method further comprising:
    transmitting an indication to modify the media content transfer session to the network resource controller for further resource usage determinations.

6. The networked computing system of claim 1, wherein the first and second communications locations of the first user equipment relate to cell coverage areas wherein the first user equipment has communicated.

7. A non-transitory computer-readable medium encoded with computer executable instructions, which when executed, performs a method for scheduling a media content transfer session in a network system having a plurality of network resources, each network resource being associated with a communications location and a network capacity, the method comprising:
    evaluating a current reference to a first communications location of a first user equipment, the first user equipment being engaged in a media content transfer session at the first communications location, the first communications location associated with a first network resource having a first network capacity; and
    determining whether to modify a schedule for the media content transfer session to the first user equipment based on a comparison of the current reference with a first network usage pattern of the first user equipment, the first network usage pattern including one or more prior communications locations from where the first user equipment had utilized the network resources of the network system,
    wherein the modification involves pausing the media content transfer session by halting a use of the first network resource to communicate with the first user equipment and then resuming communications with the first user equipment by using the second network resource.

8. The non-transitory computer-readable medium of claim 7, further comprising:
    selecting a second communications location from the first network usage pattern for subsequent scheduling of the media content transfer session to the first user equipment, the second communications locations being associated with a second network resource having a second network capacity that is different from the first network capacity.

9. The non-transitory computer-readable medium of claim 8, wherein the second communications location is selected for subsequent scheduling of the media content transfer session to the first user equipment if the first network usage pattern indicates that the first user equipment has a preferred communications location or a preferred device state for the media content transfer session that would impose a reduced load on the network resources.

10. The non-transitory computer-readable medium of claim 7, wherein the comparison further comprises comparing a timestamp associated with the current reference to a plurality of timestamps associated with the first network usage pattern for the first user equipment, such that network resource utilization is based on one or more determined chronological patterns.

11. The non-transitory computer-readable medium of claim 7, wherein the first user equipment performs the evaluating step and the determining step, the method further comprising:
transmitting an indication to modify the media content transfer session to a network resource controller for further resource usage determinations.

12. The non-transitory computer-readable medium of claim 7, wherein the first and second communications locations of the first user equipment relate to cell coverage areas wherein the first user equipment has communicated.

13. A computer-implemented method for scheduling a media content transfer session in a network system having a plurality of network resources, each network resource being associated with a communications location and a network capacity, the method comprising:
evaluating a first current reference to a first communications location of a first user equipment, the first user equipment being engaged in a first media content transfer session at the first communications location, the first communications location associated with a first network resource having a first network capacity; and
determining whether to modify a schedule for the first media content transfer session to the first user equipment based on a comparison of the first current reference with a first network usage pattern of the first user equipment, the first network usage pattern including one or more prior communications locations from where the first user equipment had utilized the network resources of the network system,
wherein the modification involves pausing the media content transfer session by halting a use of the first network resource to communicate with the first user equipment and then resuming communications with the first user equipment by using the second network resource.

14. The computer-implemented method of claim 13, further comprising:
selecting a second communications location from the first network usage pattern for subsequent scheduling of the first media content transfer session to the first user equipment, the second communications locations being associated with a second network resource having a second network capacity that is different from the first network capacity.

15. The computer-implemented method of claim 14, wherein the second communications location is selected for subsequent scheduling of the first media content transfer session to the first user equipment if the first network usage pattern indicates that the first user equipment has a preferred communications location or a preferred device state for the first media content transfer session that would impose a reduced load on the network resources.

16. The computer-implemented method of claim 13, wherein the comparison further comprises comparing a timestamp associated with the first current reference to a plurality of timestamps associated with the first network usage pattern for the first user equipment, such that network resource utilization is based on one or more determined chronological patterns.

17. The computer-implemented method of claim 13, wherein the first user equipment performs the evaluating step and the determining step, the method further comprising:
transmitting an indication to modify the first media content transfer session to a network resource controller for further resource usage determinations.

18. The computer-implemented method of claim 13 further comprises:
evaluating a second current reference to the first communications location of a second user equipment provided within the network system, the second user equipment being engaged in a second media content transfer session at the first communications location;
determining whether to modify a schedule for the media content transfer session to the second user equipment based on a comparison of the second current reference with a second network usage pattern of the second user equipment, the second network usage pattern including one or more prior communications locations from where the second user equipment had utilized the network resources of the network system; and
continuing the media content transfer session with the second user equipment at the first communications location based on the comparison of the second current reference and the second network usage pattern.

* * * * *